United States Patent [19]

Sato et al.

[11] Patent Number: 4,740,711
[45] Date of Patent: Apr. 26, 1988

[54] PIPELINE BUILT-IN ELECTRIC POWER GENERATING SET

[75] Inventors: Shoji Sato; Hiroyoshi Yamamoto; Yoshihiko Okuyama, all of Kanagawa, Japan

[73] Assignee: Fuji Electric Co., Ltd., Kanagawa, Japan

[21] Appl. No.: 936,189

[22] Filed: Dec. 1, 1986

[30] Foreign Application Priority Data

| Nov. 29, 1985 | [JP] | Japan | 60-268631 |
| Nov. 29, 1985 | [JP] | Japan | 60-268632 |
| Nov. 29, 1985 | [JP] | Japan | 60-268633 |
| May 7, 1986 | [JP] | Japan | 61-104403 |

[51] Int. Cl.⁴ .............................................. F03B 13/10
[52] U.S. Cl. .............................................. 249/52; 290/54
[58] Field of Search ........................ 290/1, 43, 52, 54

[56] References Cited

U.S. PATENT DOCUMENTS

| 3,936,681 | 2/1976 | Liebe | 290/52 X |
| 3,980,894 | 9/1976 | Vary et al. | 290/54 |
| 4,176,283 | 11/1979 | McLaren | 290/52 |
| 4,445,046 | 4/1984 | Allegre et al. | 290/52 |
| 4,555,637 | 11/1985 | Irvine | 290/52 |

FOREIGN PATENT DOCUMENTS 55-104578  8/1980  Japan ................................ 290/54

Primary Examiner—William M. Shoop, Jr.
Assistant Examiner—W. E. Duncanson, Jr.
Attorney, Agent, or Firm—Finnegan, Henderson, Farabow, Garrett & Dunner

[57] ABSTRACT

An electric power generating set for a fluid pipeline, comprising a turbine coupled to the pipeline for rotating under the pressure of the fluid moving in the pipeline; a generator coupled to the downstream end of the turbine for generating electric power upon rotation, and a heat exchanger for communicating the fluid from the turbine to the pipeline for absorbing heat from the generator.

8 Claims, 3 Drawing Sheets

PIPELINE BUILT-IN ELECTRIC POWER GENERATING SET

BACKGROUND OF THE INVENTION

1. Field of the Invention

This invention relates to an electric power generating set commonly used in steel plants, chemical plants or the like which is steam or gas powered.

2. Description of Prior Art

A conventional electric power generating set of this type is as shown in FIG. 5. In FIG. 5, reference numeral 1 designates a steam turbine rotor (or gas turbine rotor), and 2, a steam turbine casing (or gas turbine casing). The steam turbine (or gas turbine) is provided perpendicular to a pipe line 6. A power generator 3 is connected through a coupling 4 to the shaft of the steam turbine rotor (or gas turbine rotor). The generator 3 comprises a stator and a rotor. The generator 3 may be connected through a reduction gear to the turbine rotor. A fan 5 is coupled to the other end of the power generator 3 so as to cool the latter 3. Thus, heat generated by the generator 3 is dissipated into the air.

As is apparent from FIG. 5, the electric power generating set is coupled to a part of the pipeline 6. For economical use of the installation space, it is desirable that the generating set by small in size. As it rotates as high speed and acccordingly the cooling fan of the generator 3 also rotates at high speed, noise is produced. However, since the generating set is connected to the pipeline 6, as was described above, it is difficult to suppress the production of such noise.

Furthermore, since the generator normally is set perpendicular to the pipeline 6, it is liable to vibrate. The vibration cannot be eliminated without firmly supporting the pipeline 6 and the generator 3.

SUMMARY OF THE INVENTION

Accordingly, it is an object of this invention to provide an electric power generating set which utilizes steam or gas to generate electric power in steel plants, chemical plants or the like, in which the power generation efficiency is improved by recovering heat generated by the generator, noises produced thereby are reduced, and the supporting structure is simple.

Additional objects and advantages will be obvious from the description which follows, or may be learned by practice of the invention. To achieve the foregoing objects and advantages, the electric power generating set according to the invention comprises turbine means coupled to the pipeline for rotating under the pressure of the fluid moving in the pipeline; generator means coupled to the downstream end of the turbine means for generating electric power upon rotation; and heat exchange means for communicating the fluid from the turbine means to the pipeline for absorbing heat from the generator means.

Preferably, the heat exchange means includes bypass pipe means connecting the exit of the turbine means to the pipeline downstream of the turbine means disposed adjacent the generator means for receiving heat by conduction from the generator means. It is also preferred that the generator means include sealing means for isolating the generator means from the fluid.

The heat exchange means may include cylinder means passing through the generator means for increasing heat transfer from the generator means to the fluid. In addition, the generator means may include a stator coil and the cylinder means may include a sealed cylinder through the stator core for receiving fluid from the turbine means and communicating the fluid to the pipeline downstream from the generator means.

The generator means alternatively may include a shaft extending into the fluid in the pipeline and the heat exchange means also may include hollow in the shaft, and an operating solution sealed in the follow for increasing heat transfer from the generator means to the fluid. Preferably, the shaft also includes a plurality of cooling fins for improving heat radiation from shaft to the fluid.

Thus, the generating set of the invention is a pipeline built-in type electric power generator set which is high in operating efficiency, low in operating sound and simple in supporting structure.

BRIEF DESCRIPTION OF THE DRAWINGS

The accompanying drawings, which are incorporated in and constitute a part of this specification, illustrate several embodiments of the invention, and together with the description, serve to explain the principles of the invention of the drawings.

DESCRIPTION OF THE PREFERRED INVENTION

Reference will now be made in detail to the present preferred embodiment of the invention, examples of which are illustrated in the accompanying drawings.

In accordance with the invention, the electric power generating set of the invention is for a fluid pipeline. The set comprises turbine means coupled to the pipeline for rotating under the pressure of the fluid moving in the pipeline; generator means coupled to the downstream end of the turbine means for generating electric power upon rotation; and heat exchange means for communicating the fluid from the turbine means to the pipeline for absorbing heat from the generator means.

Figure 1:
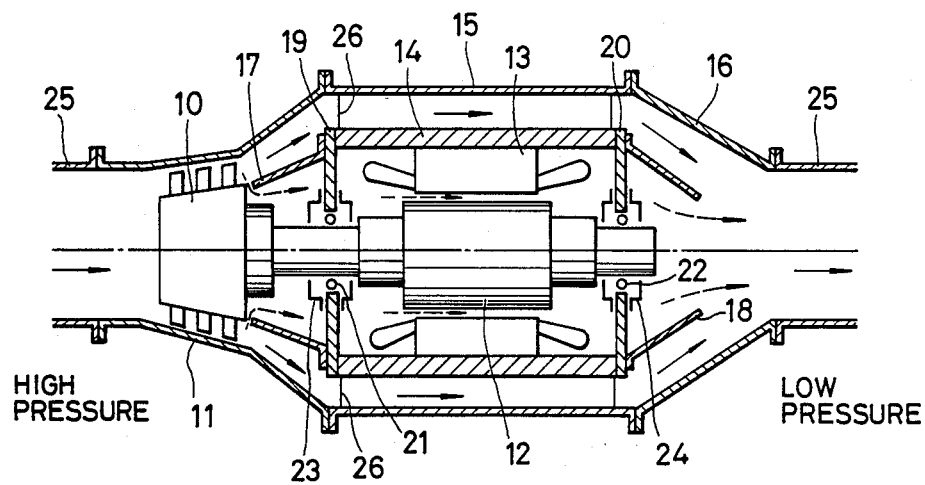
FIG. 1 is a longitudinal sectional view showing a first example of a pipeline bulit-in type electric power generating set according to this invention.

FIG. 1 is a sectional view showing a first example of a pipeline built-in type electric power generating set according to this invention. The generating set is connected between pipelines 25 for supplying steam or gas in steel plants, chemical plants or the like, in such a manner that it is laid along a pipeline.

A steam turbine casing (or gas turbine casing) 11 is connected to one of the pipelines 25 and incorporates a steam turbine rotor (or gas turbine rotor) 10. An electric power generator comprises a stator 13 and a rotor 12, and is connected to the low voltage side of the turbine. An outside pipe 15 is coaxially disposed around the generator frame 14 covering the stator in such a manner that there is a certain gap between the outside pipe 15 and the generator frame 14. One end of the outside pipe 15 is coupled to the steam turbine casing (or gas turbine casing) 11.

Further in FIG. 1, reference numeral 16 designates an outlet reducer forming a part of an other pipeline 25; 17 and 18 designate guides for straightening the flow of steam or gas; 19 and 20 designate bearing brackets; and 21 and 22 are bearings which are protected by bearing covers 23 and 24, respectively.

Figure 2:
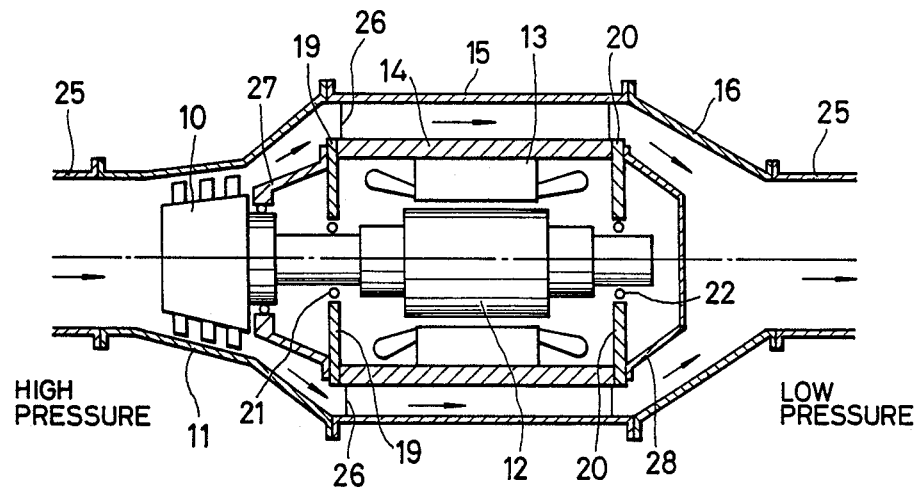
FIG. 2 is a longitudinal sectional view showing a second example of the pipeline built-in type electric power generating set according to the invention in which the generator is completely sealed.

A second example of the pipeline built-in type electric power generating set according to the invention is as shown in FIG. 2, in which parts corresponding functionally to those already described in FIG. 1 are designated by corresponding reference numerals.

In FIG. 2, reference numeral 16 designates an outlet reducer which is connected to the other end of the outside pipe 15 and forms a part of the other pipeline 25; and numeral 27 designates a seal ring. The seal ring 27 has a labyrinth packing in its axial throughhole so that the generator is completely sealed, i.e., no steam or gas enters the generator. Further in FIG. 2, reference numeral 28 designates an end cover provided on the end of the generator which is opposite to the end where the turbine rotor is provided. The end cover 28 is so designated as to withstand the difference in pressure between the steam (or gas) pressure and the air pressure in the generator.

The steam (or gas) passing through the steam turbine (or gas turbine) flows through the space between the outside pipe 15 and the generator frame 14 to absorb the heat produced by the generator, and further flows through the space between the outlet reducer 16 and the end cover 28 towards the low pressure side. In the electric power generating set thus constructed, no steam (or gas) will enter the generator.

Figure 3:
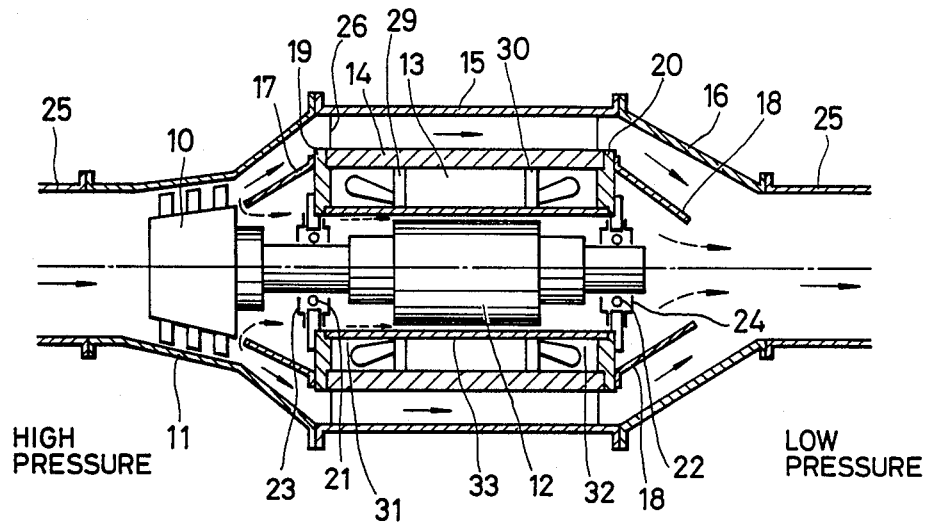
FIG. 3 is a longitudinal sectional view showing a third example of the pipeline built-in type electric power generating set according to the invention in which the stator winding and the stator core of the generator are sealed.

FIG. 3 shows a third example of the pipeline built-in type electric power generating set according to the invention. In the generating set, as shown in FIG. 3, end rings 31 and 32 are sealingly provided between end covers 19 and 20 and stator core press rings 29 and 30, respectively, and a seal cylinder 33 is provided on the inner surface of the stator core. The generator is supported on the outside pipe 15 through supporting rods 26.

In the generating set thus constructed, the inside of the stator is sealed with the seal cylinder 33 and the end rings 31 and 33, and therefore no steam (or gas) will enter the stator winding and the stator core. Accordingly, the steam (or gas) flows through the space between the outside pipe 15 and the generator frame 14, and the space between the rotor 12 and the end rings 31 end 32 and the seal cylinder 33.

In the third example of the generating set shown in FIG. 3, unlike the one in which the generator is completely sealed, the guides 17 and 18 may be not so high in mechanical strength, and it is unnecessary to use the labyringth packing for sealing the shaft of the generator.

Figure 4:
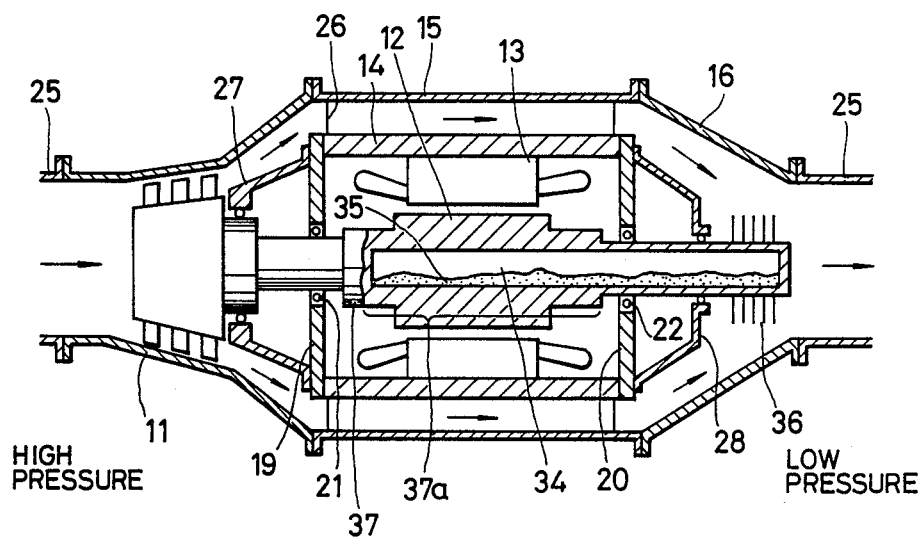
FIG. 4 is also a longitudinal sectional view showing a fourth example of the pipeline built-in type electric power generating set according to the invention in which the rotary shaft of the generator is used as a heat radiating pipe. in which the rotary shaft of the generator is used as a heat radiating pipe.
Figure 5:
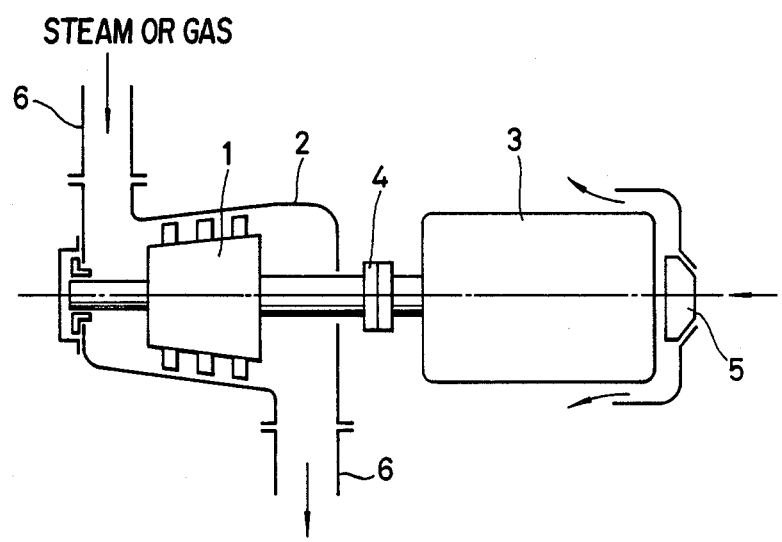
FIG. 5 is a conventional electric power generating set of this type.

A fourth example of the pipeline built-in type electric power generating set according to the invention is as shown in FIG. 4, in which parts corresponding functionally to those which have been described with reference to FIG. 2 are designated by like reference numerals.

In the generating set of FIG. 4, the rotary shaft 37 of the generator has a hollow 34 therein. An operating solution 35 is sealed in the hollow 34 so that the rotary shaft 37 serves as a heat radiating pipe. In order to improve the heat radiation of the heat radiation pipe, a plurality of cooling fins 36 are connected to the end portion of the rotary shaft opposite to the end portion on which the turbine is mounted.

In the generating set thus constructed, heat generated by the rotor 12 is transmitted to the rotary shaft 34 to heat and evaporate the operating solution 35 in hollow 34 of the rotary shaft 37. The operating solution 35 thus evaporated is moved by the pressure difference towards the shaft end portion which is relatively low in temperature. As a result, heat is transmitted to the steam (or gas) flowing along the cooling fins 36, and the operating solution is condensed. The operating solution 35 thus condensed is circulated by the centrifugal force to the heat radiating part 37a of the heat radiating pipe 37, which is relatively high in temperature.

The above-described operation is repeatedly carried out to cool the rotor 12, while the temperature of the rotor 12 is made uniform owing to the nature of the heat radiating pipe. Thus, the vibration of the generator due to thermal unbalance can be prevented.

As is apparent from the above description, according to the invention, the heat generated by the generator is absorbed by the steam (or gas) flowing in the outside pipe, which greatly improves the operating efficiency of the generating set.

In the generating set of the invention, unlike the conventional one, the generator has no cooling fan, and the operating noise is low because the generating set is built inside the pipeline. Furthermore, since the generating set is mounted in the direction of the pipe, it has a simple supporting structure and is more resistant to vibration.

In the second example of the generating the shown in FIG. 2, the generator is completely sealed so as to prevent the entrance of the steam (or gas). Accordingly, the stator winding will never be exposed to moisture. Therefore, in the generator, the insulation may be relatively thin, and it is unnecessary to provide corrosion protecting means for the bearings. Thus, the bearings may be more simple to construct.

In the third example of the pipeline built-in type electric power generating set shown in FIG. 3, a seal cylinder is provided on the inner surface of the stator core while cylindrical end rings are provided between the end covers at both ends of the stator and the press rings of the stator, respectively, so that the stator winding and the stator core of the generator are sealed. Therefore, no steam (or gas) enters the stator winding and the stator core. Accordingly, in the generator, it is not always necessary to employ a moisture-resistant stator winding, and the stator winding can be more simple to insulate.

In the fourth example of the pipeline built-in type electric power generating set according to the invention shown in FIG. 4, the rotary chaft of the generator is made hollow, and an operating solution is sealed in the hollow so that the rotary shaft serves as a heat radiating pipe. Therefore, the heat generated by the rotor is absorbed by the steam (or gas) flowing along the generator, which improves the cooling effect of the generator and makes the temperature of the rotor more uniform.

Additional modifications and variations may be made in the invention without departing from the scope or spirit of the invention.

What is claimed is:

1. An electric power generating set for a fluid pipeline, comprising:
   turbine means coupled to the pipeline for rotating under the pressure of the fluid moving in the pipeline;
   generator means coupled to the downstream end of the turbine means for generating electric power upon rotation; and
   heat exchange means for communicating the fluid from the turbine means to the pipeline and for transferring heat from the generator means to the fluid, the heat exchange means including bypass pipe means connecting the exit of the turbine means to the pipeline downstream of the generator means and disposed adjacent the generator means for receiving heat by conduction from the generator means.

2. The generating set of claim 1 wherein the generator means includes sealing means for isolating the generator means from the fluid.

3. The generating set of claim 1 wherein the heat exchange means also includes cylinder means passing through the generator means for increasing heat transfer from the generator means to the fluid.

4. The generating set of claim 3 wherein generator means includes a stator core and the cylinder means includes a sealed cylinder through the statar core for receiving fluid from the turbine means and communicating the fluid to the pipeline downstream from the generator means.

5. The generating set of claim 1 wherein the generator means includes a shaft extending into the fluid in the pipeline, and the heat exchange means also includes a hollow in the shaft, and an operating solution sealed in the hollow for increasing heat transfer from the generator means to the fluid.

6. The generating set of claim 5 wherein the shaft also includes plurality of cooling fins for improving heat radiation from the shaft to the fluid.

7. An electric power generating set for a gas pipeline, comprising:
   turbine means coupled to the pipeline for rotating under the pressure of the gas moving in the pipeline;
   generator means coupled to the downstream end of the turbine means for generating electric power upon rotation; and
   heat exchange means for communicating the gas from the turbine means to the pipeline and for transferring heat from the generator means to the gas.

8. An electric power generating set for a steam pipeline, comprising:
   turbine means coupled to the pipeline for rotating under the pressure of the steam moving in the pipeline;
   generator means coupled to the downstream end of the turbine means for generating electric power upon rotation; and
   heat exchange means for communicating the steam from the turbine means to the pipeline and transferring heat from the generator means to the steam.

* * * * *